(12) United States Patent
Chen

(10) Patent No.: US 7,763,826 B2
(45) Date of Patent: Jul. 27, 2010

(54) SYSTEM AND METHOD FOR CUTTING AND APPLYING METAL CONFIGURATIONS TO ANOTHER METAL SURFACE

(76) Inventor: Meir Chen, 499 Crown St., Brooklyn, NY (US) 11213

( * ) Notice: Subject to any disclaimer, the term of this patent is extended or adjusted under 35 U.S.C. 154(b) by 1319 days.

(21) Appl. No.: 10/499,753

(22) PCT Filed: Dec. 18, 2002

(86) PCT No.: PCT/US02/40254

§ 371 (c)(1),
(2), (4) Date: Jun. 18, 2004

(87) PCT Pub. No.: WO03/051571

PCT Pub. Date: Jun. 26, 2003

(65) Prior Publication Data

US 2004/0262271 A1    Dec. 30, 2004

Related U.S. Application Data

(60) Provisional application No. 60/341,457, filed on Dec. 18, 2001.

(51) Int. Cl.
  *B23K 26/00*  (2006.01)
(52) U.S. Cl. .......................... 219/121.64; 219/121.63; 219/121.72; 219/121.67
(58) Field of Classification Search ............ 219/121.64, 219/121.63, 121.72, 121.67, 121.85
  See application file for complete search history.

(56) References Cited

U.S. PATENT DOCUMENTS

| | | |
|---|---|---|
| D168,596 S | 1/1953 | Rubel |
| 3,345,705 A | 10/1967 | Gaupp |
| 3,393,288 A * | 7/1968 | Barstow et al. ............... 219/89 |
| 3,890,801 A | 6/1975 | Newman |
| 4,038,125 A | 7/1977 | Fries et al. |
| 4,197,720 A | 4/1980 | Nani |

(Continued)

FOREIGN PATENT DOCUMENTS

CH    649205    12/1978

(Continued)

*Primary Examiner*—M. Alexandra Elve
(74) *Attorney, Agent, or Firm*—Dorsey & Whitney LLP

(57) ABSTRACT

A method and system for rigidly connecting a first metallic plate to a second metallic plate are provided. The first plate over the second plate, and a force is applied to at least one first location of the first plate using a clamping arrangement so as to tightly couple the first plate to the second plate in a proximity of the first location. Then, the beam source is caused to generate a beam to irradiate the first plate at the first location to produce a molten material. In this manner, at least one irradiated section of the first plate is melted throughout its thickness and rigidly connected to the second plate using the molten material. During the irradiation, the first plate and the clamping arrangement are translated with respect to one another to reach at least one second location. It is also possible to provide a bonding layer or a soldering layer between the first and second layers, which can be used to rigidly connect the first and second layers to one another. Further, it is possible to simultaneously cut a section of the first layer, and weld it to the second layer.

18 Claims, 3 Drawing Sheets

U.S. PATENT DOCUMENTS

| | | | |
|---|---|---|---|
| 4,223,201 A * | 9/1980 | Peters et al. | 219/121.63 |
| 4,277,866 A | 7/1981 | Song | |
| D276,321 S | 11/1984 | Bulgari | |
| 4,500,382 A | 2/1985 | Foster | |
| 4,798,931 A | 1/1989 | Hess, III | |
| 4,859,826 A | 8/1989 | Hess, III | |
| 4,905,310 A | 2/1990 | Ulrich | |
| 5,001,816 A | 3/1991 | Oetiker | |
| 5,175,912 A | 1/1993 | Chevalley et al. | |
| 5,187,838 A | 2/1993 | Fontana | |
| 5,305,617 A | 4/1994 | Fontana | |
| 5,324,913 A * | 6/1994 | Oberg et al. | 219/121.63 |
| 5,331,723 A | 7/1994 | Mathieu | |
| 5,500,503 A | 3/1996 | Pernicka et al. | |
| 5,502,292 A | 3/1996 | Pernicka et al. | |
| 5,532,453 A * | 7/1996 | Sheller | 219/127 |
| 5,650,077 A * | 7/1997 | Zinke | 219/121.64 |
| 5,942,138 A * | 8/1999 | Toda et al. | 219/121.72 |
| 6,031,199 A * | 2/2000 | Ream et al. | 219/121.63 |
| 2002/0018871 A1 * | 2/2002 | Grigg et al. | 428/67 |

FOREIGN PATENT DOCUMENTS

| | | |
|---|---|---|
| DE | 3435207 | 9/1984 |
| DE | 3720249 | 12/1988 |
| EP | 0126547 | 11/1984 |
| FR | 2516765 | 11/1981 |

* cited by examiner

SYSTEM AND METHOD FOR CUTTING AND APPLYING METAL CONFIGURATIONS TO ANOTHER METAL SURFACE

CROSS-REFERENCE TO RELATED APPLICATION

This application claims priority from U.S. patent application Ser. No. 60/341,457 filed on Dec. 18, 2001, the entire disclosure of which is incorporated herein by reference.

FIELD OF THE INVENTION

The present invention relates to system and method of simultaneously cutting and welding (for cutting out and applying) metal designs to another metal surface using laser energy.

BACKGROUND INFORMATION

Providing a combination of metals or a variety of colors is a popular technique in jewelry designs. In order to join the elements of a design made of these metals (or different colors of the same metal), jewelers generally use various conventional methods, which include brazing, fusing, bi-metal casting, welding, electro-forming, and others.

All such conventional methods generally have a number of steps, and require different tools for each design. For example, using the brazing technique, parts of the design have to be fabricated separately, and then placed and joined according to the design. If bi-metal casting is utilized, two casting processes are generally required for each separate metal. Accordingly, additional work, time and materials are required to complete each product.

SUMMARY OF THE INVENTION

Accordingly, a need has arisen to address these issues. The system and process according to the present invention address these and other needs. In this manner, an exemplary embodiment a method and system for rigidly connecting a first metallic plate to a second metallic plate according to the present invention are provided. The first plate is provided over the second plate, and a force is applied to at least one first location of the first plate using a clamping arrangement so as to tightly couple the first plate to the second plate in a proximity of the first location. Then, the beam source is caused to generate a beam to irradiate the first plate at the first location to produce a molten material. In this manner, at least one irradiated section of the first plate is melted throughout its thickness and rigidly connected to the second plate using the molten material. During the irradiation, the first plate and the clamping arrangement are translated with respect to one another to reach at least one second location.

Additionally, the beam can be generated from a beam head of a beam generating arrangement, and the clamping arrangement is mechanically attached to the beam head. In particular, the beam can be a laser beam, and the beam head may be a laser head generating the laser beam.

In another exemplary embodiment of the present invention, the first plate may be provided on a translation stage, and, during the translation, a direction of a motion of an impingement of the beam may be the same as a direction of a motion of the clamping arrangement. In addition, during the translation, the relative translation of the clamping arrangement may be associated with a relative movement of the beam with respect to the first plate. During the irradiation of the first plate, it is also possible to simultaneously weld the first plate to the second plate, and cut the first plate throughout its thickness at the first location. A bonding layer can be provided between the first layer and the second layer, and the first layer may be welded to the second layer using the bonding layer.

According to yet another embodiment of the present invention, this procedure can be repeated on another layer provided over the first layer, even before the first layer is processed. This additional layer can be rigidly connected to the first layer in a similar manner as provided for the rigid connection of the first layer to the second layer. In addition, the first layer may be cut and connected to the second plate along a first path and a (different) second path. At least one first portion of the first layer may be provided between the first path and the second path, and at least one second portion of the first layer can be provided away from the first portion without contacting the first path or the second path. Furthermore, it is preferable to remove the first section and/or the second section of the first layer so as to expose the second layer.

A fabrication of metals and other products using the system and method according to the present invention is significantly different from conventional methods. One of the advantages of the system and method of the present invention is that multiple sets of tools are no longer needed to be utilized. For example, the design may cut from one piece of metal, and simultaneously joined with another piece of metal. Cutting and joining may be performed done at one time (i.e., simultaneously) without any need for additional steps in processing.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
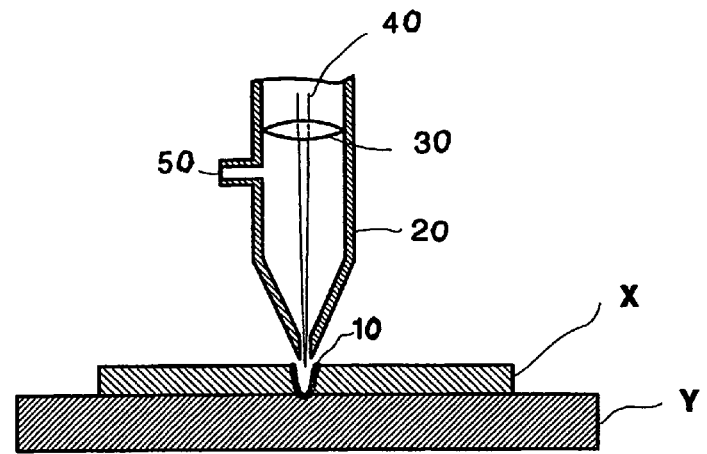
FIG. 1 shows a cross-sectional view of an exemplary embodiment of a system according to the present invention.

As shown in the system of FIG. 1, a laser beam 40 is emitted through a lens 30, and is applied to a metal plate X which lays on a top portion of another plate Y. The laser beam 40 should have sufficient energy to cut a plate X, and weld the molten metal from this cutting to a plate Y. In FIG. 1, a weld 10 can be been formed between the plate X and the plate Y. The laser beam 40 may be surrounded with a gaseous shield in a nozzle 20 of the system. A compressed gas can be introduced to the nozzle via an opening 50 of the nozzle 20. The gas exiting the nozzle 20 may remove some of the molten metal and improve cutting and welding parameters. Different gases, mixtures of them, or compressed air could be used depending on the metals being cut and welded, their thickness and the cutting parameters. In some circumstances, gas or compressed air assistance may not be necessary.

Figure 2:
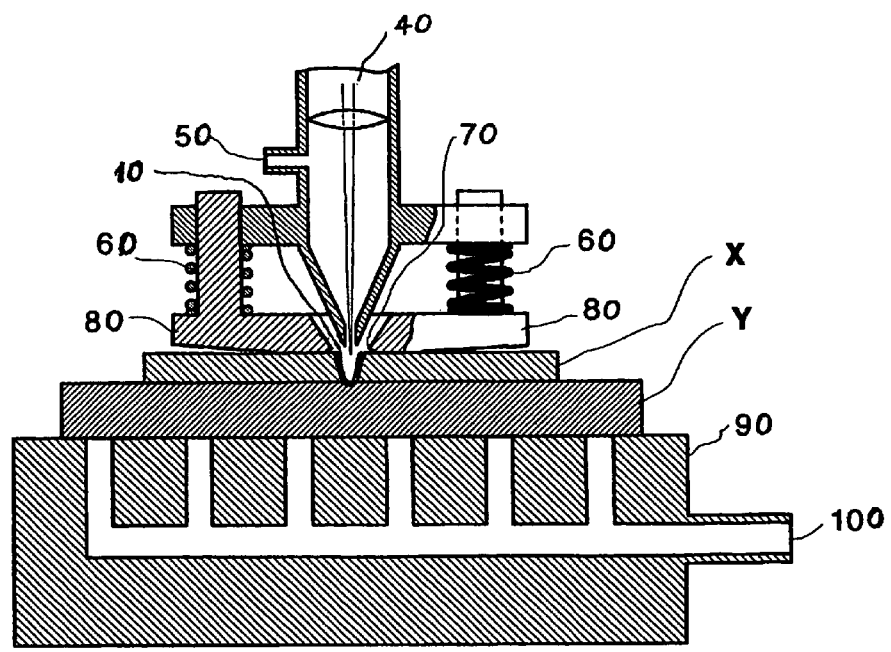
FIG. 2 shows a portion of the cross-sectional illustration of an exemplary embodiment of a method according to the present invention that uses the system of the present invention.

As shown in FIG. 2, a clamp may include a plate 80 and a plurality of compression springs 60 which press the plate 80 to the metal plates X, Y. The clamp is generally in the same position relative to the laser beam, and provides a pressure on the plate X around the beam. The clamp insures a tight contact of the plates X, Y to one another in the area where the laser beam cutting and welding occurs. The plate 80 (which slides along and on a surface of the plate X) has an opening 70 through which the laser beam 40 passes to reach the plates X, Y, while providing pressure on the plate X. The opening 70 should have a concentric shape and a sufficient size in order not to disturb the cutting and welding process (e.g., not to block the irradiation by the laser beam 40). An edge of the opening 70 can have a sharp-cut configuration such that when the plate 80 slides on the plate X, this edge can remove at least some if not all of the metal appearing on the plate X during the cutting and welding process. The excess metal can be blown and/or sucked out using a vacuum arrangement. In one exemplary embodiment of the present invention, the welding and simultaneously cutting procedures of the plates X, Y could be implemented at the corners on the side of "home" or "reference" position of a CNC table (not shown), i.e., without the need to perform such procedures at other sections of the plates X, Y. This is performed especially when extremely detailed cutting is needed.

The cutting and welding path can be controlled by either traversing the laser beam 40 or moving the plates X, Y through a stationary beam. Any conventional mechanical moving arrangement, such as the CNC table, can be used along with suitable electronic controls for performing the laser operation. As shown in FIG. 2, a vacuum chuck clamp 90 can be used to secure the plate Y into a proper position, and to assure its parallel position to the CNC table. By evacuating a vacuum chamber 100, a force is preferably exerted onto the plate Y which holds and maintains the plate Y on the vacuum chuck clamp 90.

In another possible exemplary embodiment of a method for securing the plate X into a proper position on the plate Y can be performed by tack-welding the corners of the plate X to the plate Y, while being under the pressure of the clamp. The plate X can also be secured on the plate Y by simultaneously cutting and welding (while under the pressure of the clamp) on the four corners of the plate using small welded circles having the size of spot welding. It is possible that other types of clamps and plate securing methods different than the above described method can be used to maintain the plates X, Y in the proper position and/or alignment.

Figure 3A:
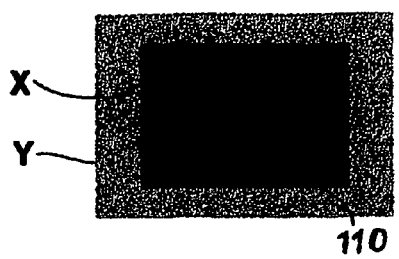
FIG. 3A shows a top view of an arrangement of plates where a circle is cut using the method according to the present invention, thus forming a disk and welding the disk onto one of the plates via a laser beam.
Figure 3B:
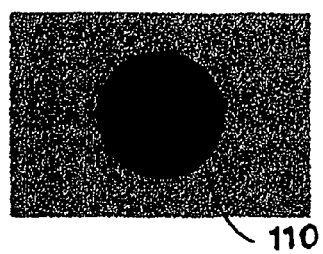
FIG. 3B shows a top view of the arrangement when a part of one of the plates outside of the circle is removed through peeling to form a disk.
Figure 3C:
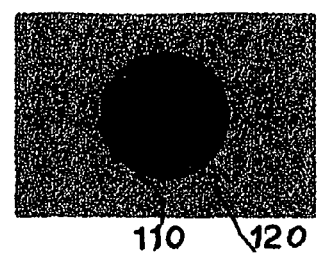
FIG. 3C shows a top view of the arrangement when a disk contained in the circle is removed.

Although the examples shown in the drawings include a disk and a ring, it should be appreciated that almost any design can be fabricated using the method described herewith. Various designs generally consist of an outside line, and possibly an inside lines. To illustrate the application of the disclosed method, FIGS. 3A, 3B, and 3C show the example of cutting a disk from one plate X and affixing it by welding to a second plate Y. FIG. 3A shows the top view of the plates X, Y from the top view, where a circle 110 is cut, in which a disk is formed and welded onto the plate Y by the laser beam 40. In this exemplary embodiment of the method according to the present invention, the plates X, Y are tightly pressed together, and the laser beam 40 is utilized to produce a specific design configuration (e.g., a circle). Gas or compressed air may be used depending on the parameters of the application. If a part of the plate X that is external of the circle 110 is removed through a peeling process, the disk formed from such part of the plate X inside the circle 110 would remain welded to the plate Y (as shown in FIG. 3B). The circular cut and welding of the disk to the plate Y occur simultaneously according to the present invention.

To conserve the quantities of the used precious metal, a further circle 120 can be cut in the metal plate Y prior to the placement of the plate X on the plate Y. The disk contained in the circle 120 can then be removed and recycled, as shown in FIG. 3C.

Figure 4A:
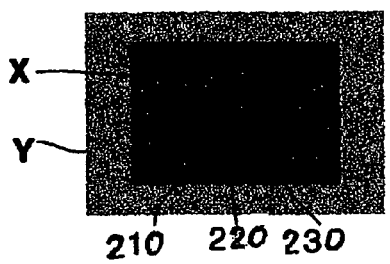
FIG. 4A shows a top view of an arrangement in which a first plate is provided on a second plate, which are simultaneously is cut to form a metal ring and that is welded unto the second plate.
Figure 4B:
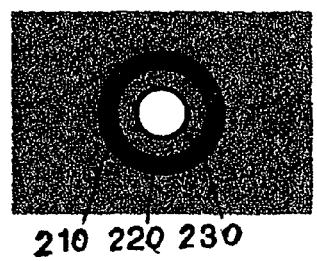
FIG. 4B shows the arrangement in which the second plate has an opening.

Another exemplary embodiment of the method according to the present invention is provided for cutting and welding a metal ring, which is formed by cutting two concentric circles in the plate X, and simultaneously welding the circles to the separate metal plate Y is shown in FIGS. 4A and 4B. FIG. 4A shows the plate X provided on the plate Y with two circles 210, 220 simultaneously cut to form the metal ring which is welded unto the plate Y. In order for the metal ring between the circles 210, 220 of the plate X to remain on the plate Y, it is may be advantageous to initially remove the metal surrounding the circle 210 using a peeling process, and then remove the metal disk inside the circle 220. If the plate Y has an opening 230 as shown in FIG. 4B, then the metal disk inside of circle 220 on the plate X may be removed by applying the pressure to the metal disk through the opening 230 in the plate Y.

Figure 5A:
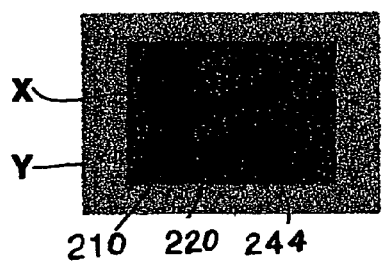
FIG. 5A shows a U-shaped hook which is cut into the first plate.
Figure 5B:
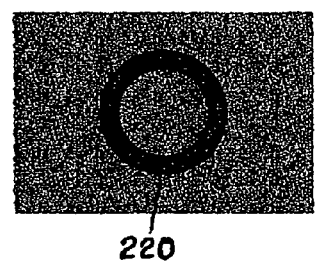
FIG. 5B shows a product of an exemplary embodiment of the method of the present invention in which the U-shaped hook can be used as a handle for removing the metal disk inside the circle.

If the plate Y does not have the opening 230, then the removal of the metal disk inside of the circle 220 can be done by various methods, such as the exemplary methods described below:

Procedure 1:

In FIG. 5A, a U-shaped hook 240 can be cut into the plate X. The U-shaped hook 240 is then used as a handle for removing the metal disk inside the circle 220, as shown in FIG. 5B. Other shapes besides the U-shape hook 240 can also be suitable for a use in this exemplary embodiment of the method according to the present invention.

Cutting the U-shape hook 240 should preferably be done prior to the placement of the plate X on the plate Y in order not to leave any marks on the surface of the plate Y. The (upper) plate X can be a thin metal plate or a foil (e.g., 0.003 inches thick). To flatten the metal plate X for the laser cutting, the metal plate X should be pressed with a clamp to a flat surface of the CNC table. Glass or a similar material that would not stick (e.g., weld) to the plate X when it is cut should be placed between the plate X and the CNC table to allow an easy removal of the plate X after the cutting procedure.

A small excess of molten metal, may appear on both sides of the plate X in the area where the cutting action occurred. This excess of the molten metal on the bottom of the plate X may disturb the tight contact needed between the plates X, Y which may be necessary later in the procedure. This excess of the metal may have to be removed with an abrasive material, such as sandpaper, and/or by using a sanding machine, etc.

Figure 6A:
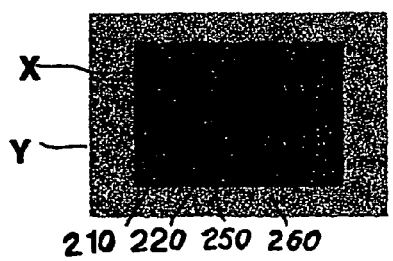
FIG. 6A shows a metal strip attached to a top portion of the plate X.
Figure 6B:
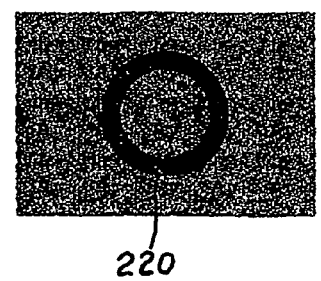
FIG. 6B shows a product of another exemplary embodiment of the method of the present invention in which the metal strip used as a handle for removing the metal disk inside of the circle.

Procedure 2:

The metal disk inside of the circle 220 of the plate X can also be removed as shown in FIG. 6A. A metal strip 250 is placed and joined to a top portion of the plate X. Then, this metal strip 250 can later be used as a handle to remove the metal disk inside of the circle 220 as shown in FIG. 6B. The joining of the strip 5 could be done by laser welding, or by using a spot weld 260 as shown in FIG. 6A. This procedure should be done carefully so as not to damage the plate Y. It will be apparent that other processes of attaching the metal strip 250 to the plate X may also be utilized. A more secure joining procedure of the plates X, Y may be performed using various methods. One such exemplary procedure utilizes a welding beam along the perimeter line. The above-described methods join the plates X, Y on the perimeter of the configuration.

To secure a bonding of the contacting surfaces of the plates X, Y, a variety of bonding metal surface methods are usable according to the present invention. For example, such exemplary procedures may include fusion or diffusion weld bonding, brazing, soldering, and/or micro-welding. It should be understood that appropriate preparations for the selected method should be performed prior to laser cutting. In the case of an exemplary brazing procedure, a thin layer of a brazing material may be applied to the bottom part of the plate X before its placement (e.g., FIG. 3C shows an exception because, in this case, the brazing material could be applied through the opening in the plate Y).

Depending on the application, the bonding process described above can be performed with or without special atmosphere, vacuum, vacuum inert gas assisted atmosphere etc. For example, to join the plates X, Y to one another, a thin layer of a bonding material can be applied as follows:

Method A. to the bottom of the plate X,

Method B. to the top of the plate Y, and/or

Figure 8:
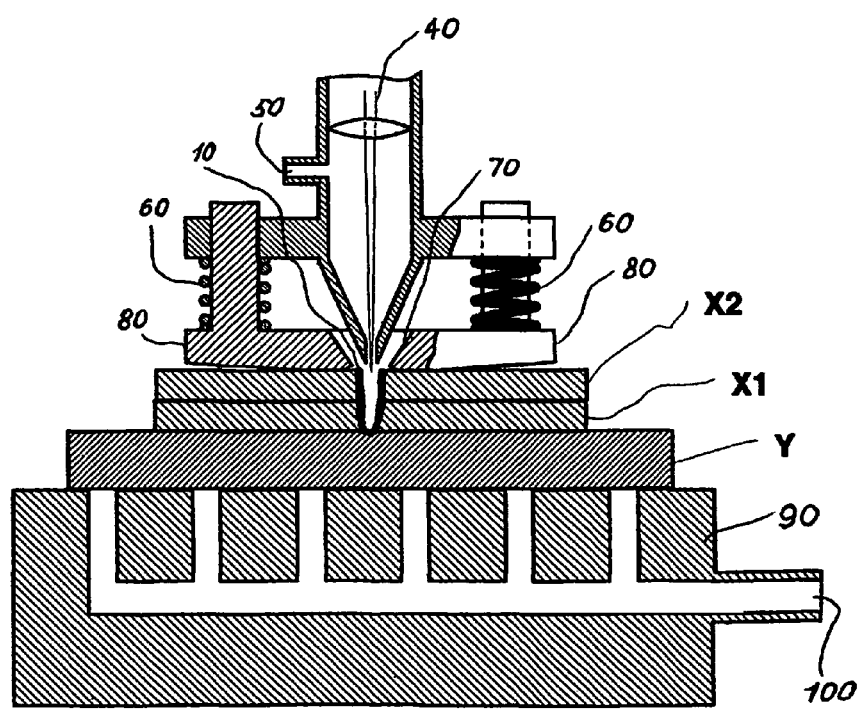
FIG. 8 shows a cross-sectional illustration of a section of the arrangement generated by of still another exemplary embodiment of the method according to the present invention, which also uses a two plate arrangement bonded to another plate, and utilizes the system of the present invention.

Method C. as a separate layer (layer X1, as shown in FIG. 8).

When methods b or c are utilized, the bonding material (what is exposed up after removing excess portions of the plate X) may be stripped away. The stripping arrangement or compound preferably dissolves the bonding material, and does not effect the material and/or the composition of the plate Y. For example, if the plate Y is composed of copper, brass or karat gold alloy, and the bonding material is made of a high phosphorus electro-less nickel, the stripping arrangement/compound can be Compound named 3136-B manufactured by OMG Fidelity, Inc. The plate X can be protected from stripping using, e.g., any known mask.

To achieve such bonding, a variety of bonding materials (with a wide range of parameters) can be used. Provided below are examples of the bonding materials that are self-fluxing. In particular the first two examples of bonding materials are provided for brazing, and the last two are provided for soldering that covering temperature range approximately 1200° F.

1. Elnic 101—Manufacturer—MacDermid Inc.
    High phosphorus electro-less nickel plating solution.
    Manufacturer suggests 0.0005 inch of deposit, melting point temperature 1630° F.
    Exemplary Experimentation: For bonding 0.003 inch thick plate X having a top area of 1.25 square inches (and which is composed of a platinum material) to 0.020 inch plate Y (composed of 18 Karat gold material), 0.0001 inch of deposit was utilized. The thinner such deposit, the easier it is to keep the gold standard of the object. This bonding can be applied using Method A or Method B.
2. Sil-Fos—Manufacturer—Handy and Harman
    This bonding arrangement/compound can have a form of a foil, a thickness as 0.0015 inch, and a melting point temperature of 1190° F.
3. Gold-tin, Au-80%, Sn-20%—Manufacturer—Williams Advanced Materials, having a melting point temperature of 536° F.
4. Gold-tin, Au-10%, Sn-90%. —Manufacturer—Williams Advanced Materials, having a melting point temperature of 423° F.

For both examples 2, 3 and 4, the bonding can be applied using one of Methods A, B, C, or a combination thereof.

When stripping the bonding materials which are gold alloys that are used for joining the plates X, Y, it is possible to utilize a process described in U.S. Pat. No. 5,009,755 (the "'755 Patent"), the entire disclosure of which is incorporated herein by reference. For example, pure silver dissolves very slowly using the method disclosed in the '755 Patent, and its thin deposit on the top surface of the plate Y would likely protect the plate Y from the stripping process. This silver deposit could be stripped thereafter using a silver stripping arrangement/compound, e.g., if the plate Y is made from a karat gold alloy, it can be used as a stripping arrangement/compound, such as Technic Envirostrip Ag manufactured by Technic Inc.

To achieve an acceptable bonding result, the plate X and Y preferably require a good contact of the superposed surfaces. This can be accomplished buy using graphite plates as a clamping device, because of its high coefficient of a thermal expansion. A variety of graphite materials with a wide range of their parameters can be used for this application. To accomplish bonding as mentioned in the Example 1, two plates of graphite R4340 which were a half an inch thick can be used. It is also possible to bond the plates X, Y (e.g., by soldering, brazing, etc.). Thereafter, a laser or another cutting arrangement can be used to cut, the plates X, Y, and a procedure can be implemented that changes the characteristics of the bonding material so that is softened (e.g., by heating the bonding material). Then, the excess material of the plate X can be peeled off. It is possible for the bonding material still resident on the plate Y after the procedure to be stripped away.

Using the exemplary methods described above, a single metal plate X is attached to the plate Y. However the plate X can be replaced with two or more metal plates superposed on one another. These plates are cut and welded one to another, either simultaneously or in succession.

Figure 7:
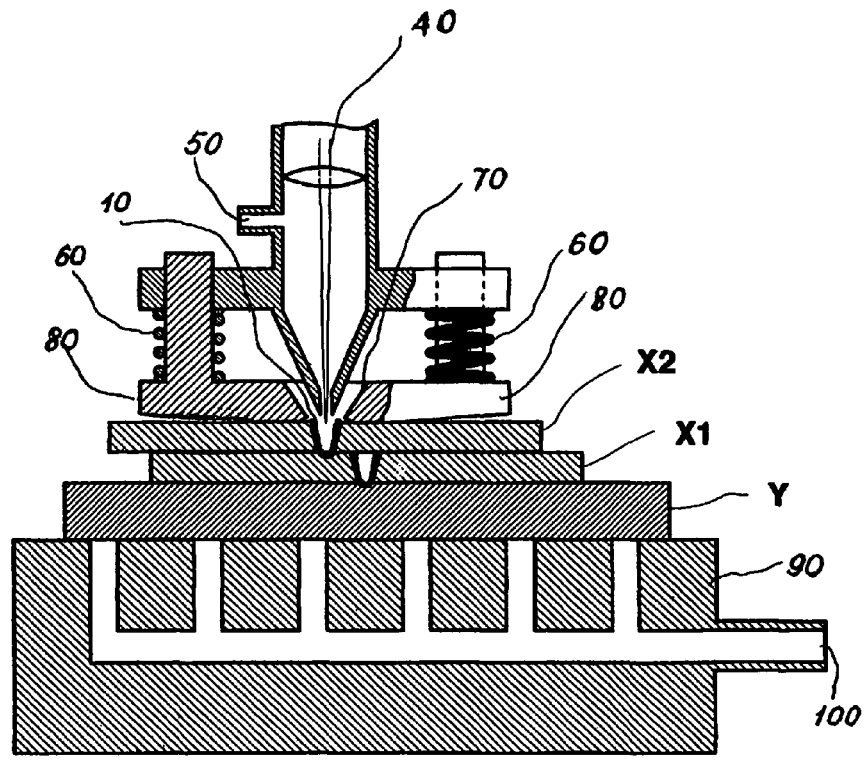
FIG. 7 shows a cross-sectional illustration of a section of the arrangement generated by yet another exemplary embodiment of the method according to the present invention, which uses a two plate arrangement bonded to another plate, and utilizes the system of the present invention.

When attaching two or more plates to the plate Y in succession, a first plate X1, as shown in FIG. 7, is first cut and welded to the plate Y. The top of the plate X1 may be prepared by removing any excess of the molten metal with an abrasive material such as sandpaper, and/or using a sanding machine, etc. Then, a second plate X2 may be placed on top of the first plate X1, and the cutting and welding process are repeated to yield a multi-layered metal object. This exemplary process may be continued for additional layers. The parameters of the process (e.g., energy of the laser beam, width of the cut, pressure of assistant gas or compressed air shield pressure, type of laser, etc.) may be adjusted according to each particular application.

Multiple metal plates can also be affixed simultaneously as shown in FIG. 8, in which the arrangement of the first and second metal plates X1, X2 is provided on top of the plate Y. In this exemplary embodiment, a single laser beam can cut both of the plates X1, X2, and may weld the first and second plates X1, X2 together and to the plate Y. Depending on the particular design, the pieces of one or both of the metal plates (i.e., the plate X1 or the plate X2) may be removed via a peeling procedure from either side of the cut.

In the above-described techniques, the plate(s) used on top of the plate Y should be of a sufficient thickness, such that when the excess metal is removed, the tear should appear only in the place of the cut or between two cuts (if the excess metal is removed there between), and possibly nowhere else. In one exemplary implementation, in a case when the plate X is a 0.003 inch thickness stainless steel 304 hard foil that is applied on the 0.020 brass plate Y, the distance between two cuts can be as little as approximately 0.012 inches. Also, when a 0.003 inch thickness heat treatable platinum foil is used for a material of the plate X applied on the 0.02 18 karat gold plate Y, the distance between two cuts can be as small as approximately 0.016 inches. It should be understood that if this foil is thinner, the above-referenced distance between the two cuts may be greater.

As indicated above, the energy of the laser beam should be enough to cut the plate X, and weld the molten metal produced from this cutting procedure to the plate Y. If the metals of the plates X, Y are made from dissimilar metals, and the plate X (e.g., the top plate) may have a significantly higher melting temperature and/or a higher laser reflection factor, various techniques can be available for welding the two metals. of the plates X, Y Such techniques are described in various publication. For example, U.S. Pat. No. 5,844,198 (the entire disclosure of which is incorporated herein by reference) discloses a method for using ND-YAG "pulse shaping" laser for welding dissimilar metals with different melting points. U.S. Pat. No. 4,023,005 (the entire disclosure of which is incorporated herein by reference) discloses a method for laser welding of the dissimilar metals with different reflectivity by covering a thin layer of metal with low reflectivity on a metal with high reflectivity.

It is preferable for the surface tension parameter of the molten metal of the plate X to be taken into consideration. For example, if this parameter is relatively high (e.g., as for platinum), it is difficult to split the molten metal by a stream of an assisted gas or air. When electro-less nickel is used as a bonding material, the cut can be made sufficiently smoother due to the fact that the molten alloy of a platinum nickel has a lower surface tension then platinum metal. The same effect may occur by placing a thin layer of a proper metal on the top of the plate X. In a case when it is desired for the thickness of the plate X needs to be thinner (e.g., 0.0001 inches instead of 0.0003 inches), it is possible to clad the top surface of the plate X with a low reflectivity strong metal (e.g., nickel), which could be stripped away after the processing is completed.

In another embodiment of the present invention, it is possible to make the cuts described above with a configuration consisting of a group of lines. Referring to FIG. 2, the plate 80 of the clamp can slides on the surface of the plate X (thus providing pressure to the plate X) The plate 80 can also act as a heat sink to absorb heat from the plate X. As previously described, a small excess of the molten metal may appear on the top of the plate X during the procedure according to the present invention. This would affect the heat transfer from the plate X to the plate 80, since the contact between these two plates may be partly interrupted. The irradiated area of the plates X, Y is generally subjected to a thermal expansion, with a particular area of the plate X expanding more that a corresponding area of the plate Y due to the plate X's accumulation of more laser energy than the plate Y (and possibly due to the fact that the plate X may be significantly thinner than the plate Y). For this exemplary purpose, the cutting would preferably start from the lines in the center of the configuration, and extend outward to the perimeter thereof. Cutting the lines in an opposite order (i.e., start from the lines at the perimeter lines and extending toward the center lines of the configuration may cause the center of the object to possible have a "bubble" at the end of this exemplary procedure. Such bubble may cause the plate X lose contact with the plate Y, and thus possibly only the plate X would be cut, without welding it to the plate Y.

This process according to the present invention can be used in different metal working techniques. These exemplary techniques can be as follows:

a) Plate X-configuration can be used as a temporary mask for different processes on the surface of plate Y (e.g., plating, etching, reticulation, etc.). When this exemplary process is completed, the mask (e.g., the plate X) can be removed by using the procedure described above, and/or by dissolving it with a proper stripping arrangement.

b) The area of plate Y that is exposed after removing one or more parts of the plate X can be used for a variety of processes such as inlay, granulation, applying metal powder, enamel etc. To achieve an inlay process in the exposed area of the plate Y, it is possible to insert and bond an object from another material which can have a mirror image configuration of this area. This object can be produced by a laser-cutting procedure. In this exemplary procedure of an inlay process, it is possible to use other techniques to expose the area of plate Y by peeling off the excess material for the plate X. In other exemplary techniques (e.g., see U.S. Pat. No. 5,660,668, the entire disclosure of which is incorporated herein by reference), a laser beam evaporation method can be used.

In another exemplary embodiment of the present invention, the top portions of the plates X, Y plate can be slightly textured (for example, via a sandblasting procedure, etc.). The top surface of the plate X (when the plate X is a top plate) can be heavily textured because it is free of contact with any other plate. However, the top surface of the plate Y should not be heavily textured because the plate X should be bonded to it.

The last cutting operation can be a step of cutting out the plate Y to its own configuration. The laser cut edge of the plates X, Y can be shaped by, e.g., CNC tools, hand tools, etc. At the end, the entire item or resulting product can be bent and shaped into any preferable object (e.g., a three-dimensional object). If a sophisticated motion and laser controllers are used, the plate surfaces do not have to be flat, and can utilize other configurations (for example, a cylindrical machining process, etc.). To ensure a particular level of the preciseness of the product produced by the CNC process, it is possible to use a CNC head (after the use of the laser head) that would utilize the same table as used by the laser head so as to CNC-machine the product (e.g., machining the edge of the plate X). This CNC-machining procedure can use the same working file for its operation as the file used for the laser cutting procedure.

In one exemplary embodiment of the system and method according to the present invention, Nd: YAG laser and the following parameters may be utilized:

Wave length 1064 nm

Average power Variable up to 35 W

Repletion Rate 50 Hz

Pulse Duration Nominally 0.1 msec

Width of the cut 0.003"

Compressed air 6 psi

Diameter of gas assistance nozzle 0.020"

X metal plate Heat-Treatable Platinum Thickness 0.003"

Y metal plate 18 Karat Yellow Gold Thickness 0.020"

Cutting Speed approximately 3 inches per minute

It should be appreciated that other lasers may also be utilized in a system for performing the method according to the present invention. Such system may utilize a processing arrangement (e.g., a personal computer executing instructions for controlling the laser beams, and plate locations).

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A method for rigidly connecting a first metallic plate to a second metallic plate, comprising the steps of:
   a) situating the first plate over the second plate;
   b) applying a force to at least one first location of the first plate using a clamping arrangement having an aperture so as to tightly couple the first plate to the second plate in a proximity of the at least one first location;
   c) with a laser beam, irradiating the first plate through the aperture at the at least one first location to produce a molten material so that at least one irradiated section of the first plate is melted throughout its thickness and rigidly connected to the second plate using the molten material;
   d) during step (c), translating the first plate and the clamping arrangement with respect to one another to reach at least one second location; and
   dd) removing at least one portion of the molten material using one of a gas or compressed air through the aperture while the first and second plates are tightly coupled by the clamping arrangement in the proximity of the at least one first location.

2. The method according to claim 1, wherein the beam is generated from a beam head of a beam generating arrangement, and wherein the clamping arrangement is mechanically attached to the beam head.

3. The method according to claim 2, wherein the beam head is a laser head generating the laser beam.

4. The method according to claim 1, wherein the first plate is provided on a translation stage, and wherein, during step (d), a direction of a motion of an impingement of the beam is the same as a direction of a motion of the clamping arrangement.

5. The method according to claim 1, wherein, during the step (d), the relative translation of the clamping arrangement is associated with a relative movement of the beam with respect to the first plate.

6. The method according to claim 1, wherein step (c) comprises the substep of simultaneously welding the first plate to the second plate and cutting the first plate throughout its thickness at the at least one first location.

7. The method according to claim 6, further comprising the step of:
   e) before step (a), providing a bonding layer between the first layer and the second layer, wherein the first layer is welded to the second layer using the bonding layer.

8. The method according to claim 7, further comprising the steps of:
   f) after steps (c) and (d), applying a further force to at least one third location of the first plate using a clamping arrangement so as to tightly couple the first plate to the second plate in a proximity of the at least one third location, wherein the at least one third location is different from the first and second locations;
   g) with a beam, irradiating the first plate at the at least one third location to cut the first plate at the at least one third location and rigidly connect the first plate to the second plate; and
   h) during step (g), translating the first plate and the clamping arrangement with respect to one another from the at least one third location to reach at least one fourth location.

9. The method according to claim 8, wherein, in steps (c) and (d), the first layer is cut and connected to the second plate along a first path, wherein, in steps (g) and (h), the first layer is cut and connected to the second plate along a second path which is different than the first path, wherein at least one first portion of the first layer is provided between the first path and the second path, and wherein at least one second portion of the first layer is provided away from the at least one first portion without contacting one of the first path and the second path.

10. The method according to claim 9, further comprising the step of:
    i) removing at least one of the at least one first portion and the at least one second portion of the first layer so as to expose the second layer.

11. The method according to claim 1, further comprising, prior to the execution of step (a), the steps of:
    j) situating a third plate over the first plate;
    k) applying a further force to at least one fifth location of the third plate using the clamping arrangement so as to tightly couple the first plate to the third plate in a proximity of the at least one a fifth location;
    l) with the beam, irradiating the third plate at the at least one fifth location to produce a further molten material so that at least one irradiated section of the third plate is melted throughout its thickness and rigidly connected to the first plate using the further molten material; and
    m) during step (l), translating the third plate and the clamping arrangement with respect to one another from the at least one third location to reach at least one sixth location.

12. The method according to claim 1, wherein the first plate is rigidly connected to the second plate by at least one of soldering and brazing the at least one section of the first plate to the second plate.

13. The method according to claim 1, wherein step (c) further comprises providing a gaseous shield approximately along a direction of the beam onto the at least one first location.

14. The method according to claim 1, wherein step (c) is performed after step (b).

15. The method according to claim 1, wherein the at least one portion of the molten material is removed using a gas.

16. The method according to claim 15, wherein the gas is a compressed gas, and further comprising blowing away the at least one portion of the molten material using the compressed gas.

17. The method according to claim 1, further comprising, after irradiating the first plate throughout its thickness and removing the at least one portion of the molten material, separating the first plate into a first piece and a second piece along a path between the first and second locations.

18. The method according to claim 17, wherein the first and second pieces of the first plate are separated from the second plate via a peeling procedure.

* * * * *